May 29, 1956 R. CRANE, JR., ET AL 2,748,384
AUTOMATIC FREQUENCY CONTROL CIRCUIT
Filed April 2, 1953

INVENTOR.
ROBERT CRANE, JR.
MICHAEL W. McKAY
BY
H. A. Mackey
ATTORNEY

United States Patent Office 2,748,384
Patented May 29, 1956

2,748,384

AUTOMATIC FREQUENCY CONTROL CIRCUIT

Robert Crane, Jr., White Plains, and Michael W. McKay, Tarrytown, N. Y., assignors to General Precision Laboratory Incorporated, a corporation of New York Application April 2, 1953, Serial No. 346,312

8 Claims. (Cl. 343—17.2)

This invention relates to automatic frequency controls and more specifically to such controls wherein that property of a resonant circuit is employed whereby at resonance its output phase changes rapidly relative to its input frequency.

This invention is useful in connection with radio duplex circuits in which a resonant component is employed to introduce isolation between the transmitter and the receiver at resonance. In such duplex circuit difficulty has been encountered in the past, particularly at microwave frequencies, because of the difficulty of maintaining the transmitter frequency constant with sufficient accuracy. This transmitter frequency maintenance is particularly difficult when the ambient temperature changes greatly, and is complicated by the fact that temperature changes may affect the transmitter and the isolating resonant component differently, while the isolating property of the resonant component depends upon the interrelation of the two.

The instant invention solves this difficulty by making the isolating component itself the frequency standard for the transmitter. That is, the optimum isolation frequency of the isolation component is employed as the standard to which the arrangement of this invention holds the transmitter frequency. Therefore the receiver isolation is maintained at its optimum value at all times, notwithstanding dimensional changes of the resonant isolation component due to temperature, and changes of any kind in the transmitter, in its power supply, and in the transmitter load.

As a specific example of the use of this invention, a radar instrument is selected containing a continuous microwave transmitter, a radar receiver and an antenna. A resonant isolating component commonly called a duplexer is employed to interconnect the transmitter, receiver and antenna so that transmitted energy is permitted to pass to the antenna but not to the receiver, while at the same time echo energy is passed to the receiver. The transmitter is frequency modulated and a small amount of transmitter energy passes through the isolating component to the receiver, the isolation not being perfect. In so passing, the frequency modulation is translated to amplitude modulation and, as the transmitter frequency passes through the isolation component critical frequency the amplitude modulation reverses phase. This phase reversal is detected and made to control the transmitter frequency.

One purpose then of this invention is to provide an automatic frequency control employing the resonant frequency of a resonant isolating component as its frequency standard.

Another purpose of this invention is to provide an arrangement including a resonant isolating component for duplex radio transmission and reception, the transmitter being automatically controlled to or near the resonant frequency of the resonant isolating component at which its isolation is greatest.

A more specific purpose of this invention is to provide continuous wave radar apparatus having very high effective frequency stability which results in a complete absence of interference by the transmitter with operation of the receiver.

A further understanding of this invention may be secured from the detailed description and the drawings, in which.

Figure 1:
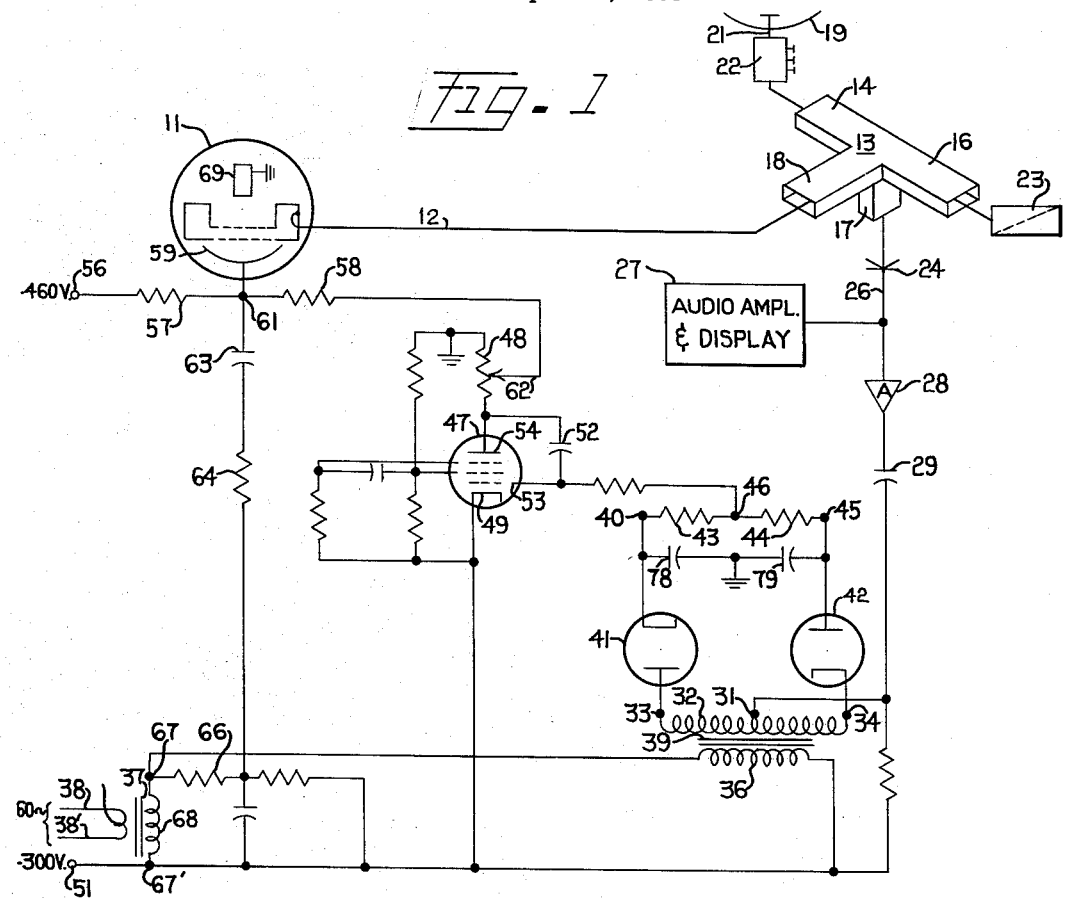
Figure 1 is a schematic circuit of an embodiment of the invention.

Referring now to Figure 1, a reflex klystron oscillator 11 is arranged to generate alternating current in the microwave frequency range, for example at a frequency of 10,000 megacycles per second. The klystron output is transmitted through a microwave conductor schematically represented at 12 to a hybrid circuit which may be of any form suitable for the frequency employed, of which two forms useful at microwave frequencies are the hybrid ring and the hybrid junction or magic tee. For use in the present example the rectangular guide magic tee form is selected and is depicted at 13. The tee 13 has two collinear arms 14 and 16, a series arm 17, and a shunt arm 18 which is connected to conductor 12 and serves as the input arm for the energy generated by the oscillator 11. Physically, the ends of these arms may be called terminations. Electrically the arms should be terminated in their characteristic impedances, and the impedances connected to them are frequently called terminations.

If the arm terminations exactly match the guide characteristic impedance and if the hybrid junction is perfect there will be no leakage of power from the input arm 18 to the receiver arm 17 and the isolation is perfect at any frequency. Such isolation is impossible in practice but it can be approximated at a selected frequency by tuning one arm.

An antenna 19 is connected to the collinear arm 14 by appropriate waveguide conductors 21. The antenna 19 may be of the dipole and dish reflector type schematically shown, or may alternatively be of any other type such as the linear array or the horn.

The impedances of the antenna 19, conductor 21 and arm 14 are matched by an impedance transformer, stub tuner 22 or other conventional means to avoid impedance discontinuities and consequent reflections of power. Manual adjustment of the tuning control 22 is one means by which the isolation is adjusted to near infinity at one frequency thus providing a frequency reference for the automatic frequency control. The other collinear arm 16 is terminated in a nonreflective termination which may consist of a graphite resistor card in a hollow wave guide stub as indicated at 23. The series arm 17 is connected to a detector or demodulator 24 of the crystal type, and through it and conductor 26 to an audio amplifier and radar display 27. These components, 24 and 27, together constitute a simple form of radar receiver.

In place of the detector 24 the conventional superheterodyne receiver may be employed, including first detector, beat frequency or local oscillator, intermediate frequency amplifier and second detector, and also if desired a local oscillator automatic frequency control and an automatic amplifier gain control. This local oscillator automatic frequency control is, however, completely separate and distinct from the microwave transmitter oscillator automatic frequency control of this invention.

The apparatus so far described, with appropriate direct-current power supply, constitutes a continuous wave radar instrument. The necessary frequency stability is secured by the employment of automatic frequency control with its error signal secured from the output of detector 24. This error signal is amplified by an amplifier 28, which is designed to pass only the frequency of 60 C. P. S. The amplifier output is coupled through condenser 29 to the center tap 31 of a transformer secondary winding 32 having end terminals 33 and 34. The transformer primary winding 36 is connected through an isolating transformer 37 to a 60-cycle source at 38 and 38'. The transformer secondary winding terminals 33 and 34 are connected through rectifying diodes 41 and 42 to equal subtracting resistors 43 and 44, having a center tap 46, the combination constituting a phase detector having a direct current output.

The voltage existing at the tap 46 is amplified in a direct-coupled amplifier comprising pentode 47, the plate current of which is drawn through a grounded voltage divider 48, the cathode 49 being returned to a 300-volt source of negative potential at the terminal 51. The amplifier 47 is provided with a Miller integrating condenser 52 between its control grid 53 and anode 54, giving it a low-pass characteristic.

The klystron 11 secures its required negative reflector voltage from two sources, a —460 volt supply imposed on terminal 56, and the voltage supplied by the divider 48 to the adjustable tap 62. These two sources are connected through resistors 57 and 58, with the reflector 59 connected to the resistor junction 61. The voltage of this junction is therefore dependent both upon the position of the voltage divider slider 62 and upon the drop through divider 48 as controlled by the direct-coupled amplifier 47. The function of slider 62 is to provide a means of coarse manual frequency control of oscillator 11.

The klystron reflector 59 is also connected to a 60-cycle source which frequency modulates the klystron's microwave output, this connection being through condenser 63 and resistors 64 and 66 to one terminal 67 of the supply transformer secondary winding 68, the other terminal 67' being effectively grounded for alternating current by being connected to the negative supply terminal 51. The klystron cathode 69 is grounded, completing both alternating and direct current circuits.

As is well known, the frequency of oscillation of all microwave generators is dependent upon the several supply voltages. This is particularly true of the reflex klystron, which is highly sensitive to changes in the negative voltage applied to its reflector. The reflex klystron 11 therefore emits a microwave energy output having a frequency which is dependent upon and controllable by the negative voltage of slider 62. In addition, the 60-cycle modulation applied to the reflector 59 periodically varies the output frequency over a narrow range at the 60-cycle rate.

A modulation frequency of 60 cycles is here selected as the most convenient, but it is to be understood that the modulation frequency may be of any frequency greater than the slow changes having periods or time constants of seconds or minutes the neutralization of which calls for the use of automatic frequency control, and may have any frequency less than those which would interfere with the function of the equipment. For example, in the case of the microwave radar moving target apparatus frequencies of less than several hundred per second would not be experienced.

The microwave energy output of the klystron 11 is applied through conductor 12 to the shunt arm 18 of magic tee 13, where the energy divides equally in the collinear arms 14 and 16 and is isolated from the series arm 17. This isolation is theoretically perfect at the optimum frequency which depends on the physical dimensions of the magic tee, even with no internal matching devices, provided the collinear arms are terminated in their characteristic impedances or have other non-reflective terminations. The energy passing out collinear arm 14 is transmitted to antenna 19, where it is radiated, while energy passing out arm 16 to the termination 23 is absorbed.

It is thus seen that ideally no energy reaches the receiver directly from the transmitter. Actually it has been found that the isolation may be made very high. It may easily be reduced, however, by introducing a slight mismatch at the matching device 22, and it is in fact found desirable to reduce the isolation thus to permit a transmitter signal attenuated by about 70 db to enter the receiver as a beat detector reference frequency, and to furnish the carrier for the 60 C. P. S. error signal for automatic frequency control.

Radar echo energy received by the antenna 19 is transmitted to the arm 14, from which one-half passes to the detector 24. To prevent reflective losses the junction may be internally matched for this case. The echo energy which beats with the leakage energy to produce a beat frequency signal which is then detected in detector 24, transmitted through conductor 26 to the amplifier and radar display 27, where the echo returns are appropriately displayed.

The microwave energy which "leaks" through the magic tee from the transmitter to the output arm 17, frequency modulated at 60 C. P. S., is in effect discriminated by the resonant characteristic of the magic tee combined with the slightly mismatched tee terminations which mismatch is highly frequency sensitive, so that as it is presented to detector 24 the energy is amplitude modulated at 60 C. P. S. The detector demodulates it and applies it as 60-cycle energy to amplifier 28. The amplifier, since it is tuned to 60 C. P. S., does not amplify other frequencies and passes only the 60 C. P. S. energy. This 60 cycle energy, however, having an amplitude that is a definite proportion of the carrier amplitude at the detector 24, depends upon both the amount of transmitter energy permitted to pass through the magic tee and the position of the frequency of this energy on the resonance curve of the magic tee.

Figure 3:
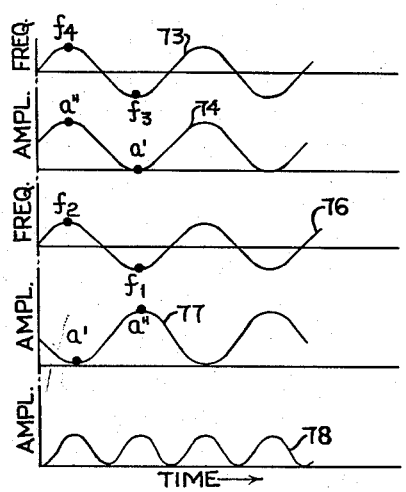
Figures 2 and 3 are graphs illustrating the operation of the invention.
Figure 2:
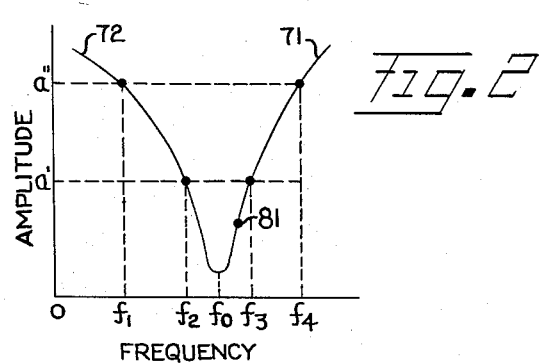

This resonance curve is shown in Fig. 2, in which the abscissae represent generator frequency at any instant of time and the ordinates represent output energy amplitude as transmitted to the detector 24. The output amplitude changes are seen to be in phase with input frequency changes in the branch 71, while opposite in phase in branch 72. That is to say, at any frequency above the frequency $f_0$ an increase in the frequency impressed on the input arm 18 results in an increase in the amplitude of the energy appearing in the output arm 17, whereas at frequencies below the frequency $f_0$ an increase in the frequency impressed on the input arm results in a reduction of the amplitude of the energy in the output arm 17. Since the modulating 60-C. P. S. energy causes the frequency of the generated klystron microwave energy to change at the 60-cycle rate, these frequency changes are illustrated in Fig. 3 by the wave 73, the abscissae representing time and the ordinates microwave frequency. The detector output error signal amplitude changes occurring by reason of frequency changes between the frequencies $f_3$ and $f_4$ of Fig. 2 are illustrated by the curve 74, the point $a''$ occurring at the same time as the frequency $f_4$ and $a'$ as the frequency $f_3$. Similarly, if the modulation causes frequency changes between $f_1$ and $f_2$ this frequency change can be illustrated by the curve 76, while the resultant amplitude variations of detector output error signal are illustrated by the curve 77. However, in the latter case the amplitude changes are opposed in phase to the frequency changes, and the phases of curves 77 and 74 are opposite. Thus it will be apparent that by detecting the phase of the 60 C. P. S. error signal output of detector 24 it may be ascertained whether the generator frequency is above or below the magic T resonant frequency $f_0$, Fig. 2. When the generator frequency is the same as $f_0$ then the detector output will be as shown in curve 78. Note that there is no 60 cycle present, only energy at twice 60 cycle plus direct current.

Such phase detection is accomplished through the medium of the transformer 39 and the associated circuit including the diodes 41 and 42. It will be apparent that the grid cathode bias of the tube 47 depends on three component potentials, that of the reference terminal 51, a rectified potential derived from the alternating current sources 38, 38' through the transformer, and a rectified potential derived from the error signal applied to the midtap 31 of the secondary 32.

In the absence of any error signal the 60 C. P. S. potentials at the secondary terminals 33 and 34 relative to the datum potential at terminal 51 are equal but opposite and when rectified by the diodes 41 and 42 produce equal but opposite direct current potentials at the terminals 40 and 45 so that the direct current potential at the terminal 46 forming the junction of equal resistors 43 and 44 is balanced at the datum potential.

If, however, a small error signal potential is impressed on the terminal 31 this error signal will be either in phase or out of phase with the alternating voltage induced by the primary 36 and appearing at the terminal 33 and conversely out of phase or in phase with the voltage at terminal 34 induced by the primary. The phase condition of course depends on which slope of the resonance curve of Fig. 2 the operation takes place.

Assume for example operation takes place above the selected frequency $f_0$ and hence is on the right side of the curve of Fig. 2 at point 81. With proper polarization of the transformer 39 a small alternating current potential at terminal 31 derived from the arm 17 through the rectifier 24, amplifier 28 and coupling condenser 29, will be in phase with the induced alternating potential at terminal 34 and at the same time out of phase with the induced potential at terminal 33. This results in an increased negative direct current potential at the terminal 40 and a reduced negative potential at terminal 45 so that the midterminal 46 becomes more negative. The plate current of the pentode is therefore reduced resulting in a less negative potential at the slider 62 and hence a less negative potential being impressed on the reflector 59 thus decreasing the frequency of the output of the klystron 11 towards or to the selected frequency $f_0$.

Conversely, if operation takes place below the selected frequency $f_0$ the phase relationships between the error signal and the potentials at terminals 33 and 34 are reversed resulting in a less negative potential at terminal 46, and an increased negative potential on the reflector 59 so that the output frequency of the klystron 11 is increased again adjusting it towards or to the selected frequency.

While in the above description the invention has been applied to a radar circuit for explanatory purposes, it will be understood that its utility is not so limited and that it may be readily adapted to other appropriate circuit arrangements.

Likewise those skilled in the art will appreciate that other microwave generators such as magnetrons which can be frequency modulated may be utilized, in suitable circuits, in place of the klystron described.

What is claimed is:

1. An automatic frequency control circuit comprising, a microwave generator, means for frequency modulating said generator at a selected low frequency, means having a signal transfer characteristic which is a null at a selected frequency and which increases in proportion to the departure from said selected frequency, a phase detector energized by the output of said last mentioned means and a source of energy at said selected low frequency, and means for controlling the frequency of said generator by the output of said phase detector.

2. An automatic frequency control circuit comprising, a microwave generator, a four arm microwave hybrid junction, each arm of which is terminated in its characteristic impedance at a selected frequency so that energy introduced in one arm at a selected frequency results in an output in another arm which is a null at said selected frequency and which increases in proportion to the departure from said selected frequency means for frequency, modulating said generator at a selected low frequency, means for impressing the output of said generator on said one arm, phase detector means having energy of said selected low frequency and the output of said other arm impressed thereon, and means for controlling the frequency of said generator by the output of said phase detector means.

3. An automatic frequency control circuit comprising, a microwave generator, a four arm microwave hybrid junction, each arm of which is terminated in its characteristic impedance at a selected frequency so that the introduction of energy in one arm results in an output in another arm which is at a null when said introduced energy is at said selected frequency and which increases in proportion to the departure from said selected frequency of said introduced energy, a source of low frequency alternating current energy, means for frequency modulating said generator by energy derived from said low frequency source, means for impressing the output of said generator on said one arm, means having energy from said low frequency source and output energy derived from said other arm impressed thereon and producing therefrom a potential the magnitude of which depends on the amplitude of the energy output of said other arm and the relative phase relation between said energy and the energy of said low frequency source, and means for controlling the frequency of said generator in accordance with the magnitude of said potential.

4. An automatic frequency control circuit comprising, a reflex klystron oscillator including a reflector electrode, a four arm microwave hybrid junction, each arm of which is terminated in its characteristic impedance at a selected frequency so that the introduction of energy in one arm results in an output in another arm which is at a null when said introduced energy is at said selected frequency and which increases in proportion to the departure of said input energy from said selected frequency, a source of low frequency energy, means for impressing said low frequency energy on said reflector electrode to frequency modulate said reflex klystron oscillator, means impressing the output of said oscillator on said one arm, phase discriminating means having impressed thereon energy derived from said low frequency source and a signal derived from the output of said other arm, producing therefrom a potential the magnitude of which depends on the relative phase relation between the energy derived from said low frequency source and said other arm output signal and the amplitude of said other arm output signal, and means for impressing said potential on said reflector electrode.

5. An automatic frequency control circuit comprising, a microwave generator, a magic tee each arm of which is terminated in its characteristic impedance at a selected frequency, a source of low frequency energy, means for frequency modulating said generator at said low frequency by energy derived from said low frequency source, means for impressing the output of said generator on one side arm of said magic tee, a phase detector energized by energy derived from said low frequency source and an output signal of the same low frequency derived from the other side arm of said magic tee producing a direct current potential whose magnitude is proportional to the relative phase relation of said low frequency source energy and the output signal of said other arm and the magnitude of said output signal, and means for controlling the frequency of said microwave generator in accordance with said direct current potential.

6. An automatic frequency control circuit comprising, a reflex klystron oscillator including a reflector electrode, means for impressing a low frequency potential on said reflector electrode to frequency modulate said oscillator at said low frequency, a magic tee each arm of which is terminated in its characteristic impedance at a selected frequency, means for impressing the output of said oscillator on one side arm of said magic tee, frequency selective means passing only signals of said low frequency connected to the other side arm of said magic tee, a phase detector having said low frequency potential and the output of said frequency selective means impressed thereon and producing therefrom a direct current potential the magnitude of which is dependent on the relative phase relation and relative magnitudes of said low frequency potential and said frequency selective means output, and means for varying the potential of said reflector electrode as a function of said direct current potential.

7. An automatic frequency control circuit comprising, a microwave generator, a transmitting and receiving antenna, a utilization circuit, frequency sensitive duplexing means interconnecting said generator, antenna and utilization circuit, said duplexing means having the characteristic of maximum transfer of energy in the direction from said generator to said antenna at a selected operating frequency, minimum transfer of energy in the direction from said generator to said utilization circuit at said selected operating frequency with increase transfer of energy in proportion to the departure in frequency from said selected frequency and maximum transfer in the direction from said antenna to said utilization circuit at said selected frequency, a low frequency signal source, means for frequency modulating said generator by the low frequency signal of said source, phase discriminating means having said low frequency signal and energy of the same low frequency derived from said utilization circuit impressed thereon, and means operated by the output of said phase discriminating means for controlling the frequency of said discriminator.

8. An automatic frequency control circuit comprising, a microwave generator, a transmitting and receiving antenna, a utilization circuit, a four arm frequency sensitive hybrid junction interconnecting said generator, antenna and utilization circuit in such fashion that at the design frequency of the hybrid junction a maximum amount of energy is transferred from said generator to said antenna and from said antenna to said utilization circuit while a minimum amount of energy is transferred from said generator to said utilization circuit, said last mentioned amount increasing as the frequency of the generated energy departs from the design frequency of the hybrid junction, a source of low frequency alternating current, means for frequency modulating said generator by said alternating current, phase discriminating means having said low frequency alternating current and energy of the same low frequency derived from said utilization circuit impressed thereon, said phase discriminating means producing therefrom a potential the magnitude of which depends on the relative phase relation between said low frequency alternating current and the energy derived from said utilization circuit and the amplitude of the energy derived from said utilization circuit, and means for controlling the frequency of said generator by said potential.

References Cited in the file of this patent

UNITED STATES PATENTS

| 2,135,946 | Mountjoy | Nov. 8, 1938 |
| 2,445,895 | Tyrrell | July 27, 1948 |
| 2,475,074 | Bradley et al. | July 5, 1949 |
| 2,591,257 | Hershberger | Apr. 1, 1950 |
| 2,648,007 | Witkowski | Aug. 4, 1953 |

OTHER REFERENCES

Kyhl, abstract, of application Serial Number 580,014, published in 631 O. G. 883.